UNITED STATES PATENT OFFICE.

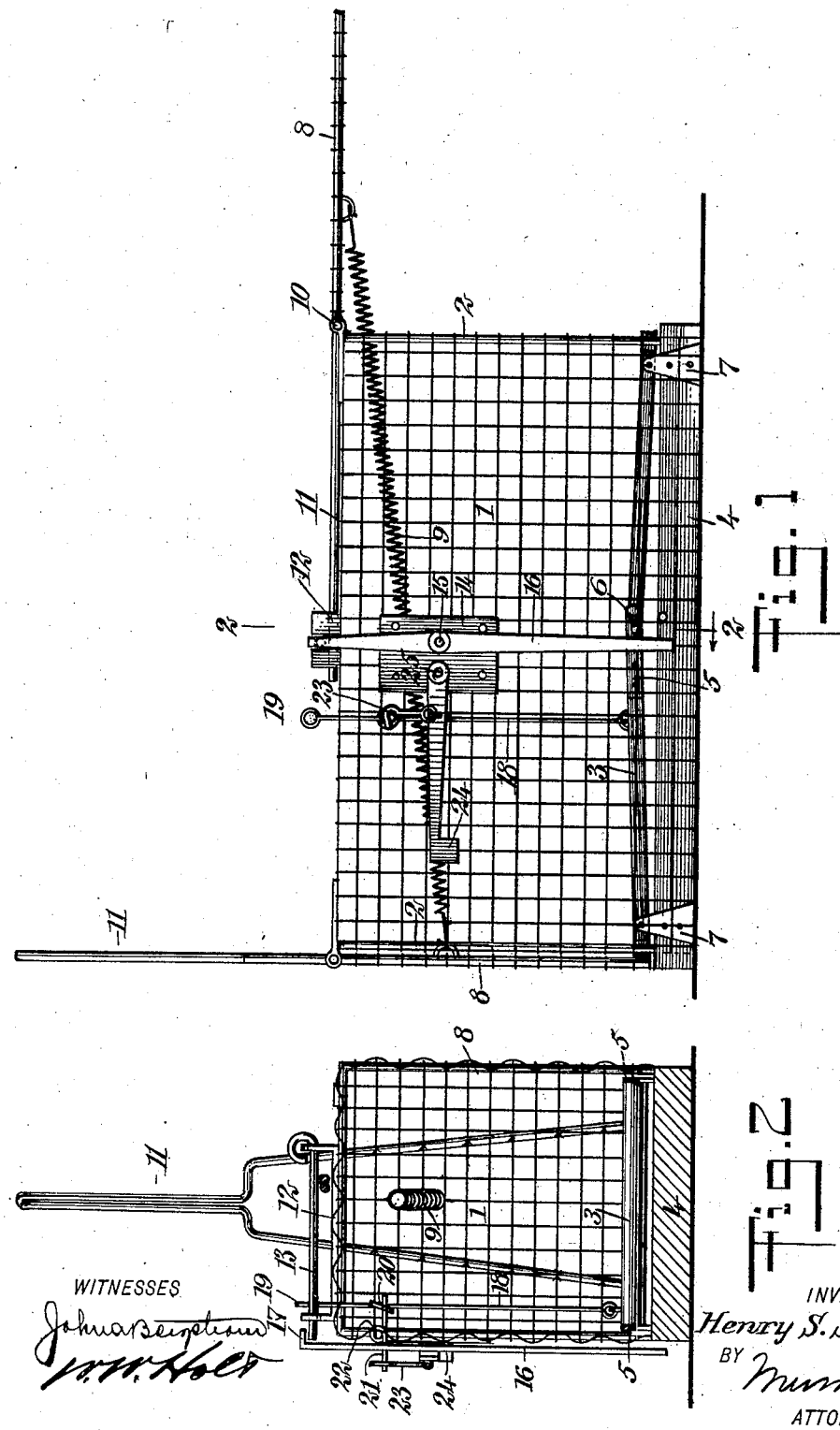

HENRY S. STICK, OF GLENVILLE, PENNSYLVANIA.

ANIMAL-TRAP.

No. 833,562.　　　Specification of Letters Patent.　　　Patented Oct. 16, 1906.

Application filed August 29, 1906. Serial No. 332,475.

*To all whom it may concern:*

Be it known that I, HENRY S. STICK, a citizen of the United States, and a resident of Glenville, in the county of York and State of Pennsylvania, have invented a new and Improved Animal-Trap, of which the following is a full, clear, and exact description.

This invention is an improved animal-trap especially adapted for catching animals of varying sizes, ranging from a rat to a small dog; and it consists of a cage having a double floor and opened at both ends, the ends being closed when the trap is not set by spring-operated doors. The upper floor of the cage is made in two parts hingedly connected together, which, through the intermediary of a novel trigger mechanism, springs the trap and closes the door or doors by the weight of the animal.

Reference is to be had to the accompanying drawings, forming a part of this specification, in which similar characters of reference indicate corresponding parts in both the figures, in which—

Figure 1 is a side elevation of one embodiment of my improved trap, showing one of the doors open as when the trap is set. Fig. 2 is a transverse central vertical section substantially on the line 2 2 of Fig. 1.

The trap comprises a cage 1, having end-frames 2 and a double floor 3 and 4, respectively. The floor 3 extends ubstantially the entire length of the trap and is made in two parts of equal length hingedly connected together at the center of the trap by plates 5 fixed at the sides of one half of the floor and engaging pins 6, projecting from the sides of the other half, slots being provided in the plates for this purpose. The outer end of each of the halves of the upper floor of the trap is pivotally connected to brackets 7 fixed to and extending upwardly from the floor 4. Each end of the cage 1 is adapted to be closed by doors 8 of like construction and connected together by a long spiral spring 9, extending the full length of the trap. The doors, as shown, are hingedly connected at their upper ends to the cage by the hinges 10 and have fixed to them upwardly-extending arms 11, each arm being made of a single piece of wire bent upon itself, as illustrated in Fig. 2. At the center of the trap is fixed to the top thereof a metal plate 12, provided with upwardly-turned flanges at each end, one of said flanges being pivotally engaged by a pin 13, the pin passing through a notch n the opposite flange and slightly extended beyond it. A plate 14 is fastened to the center of the trap on this side to which is pivoted at 15 a lever 16, the upper arm of which is bent to form an inwardly-projecting toe 17, adapted to engage the overhanging end of the pin 13.

Connected to one of the hinged members 3, preferably near their hinged connection, is a rod 18, passing upwardly through the cage at one side thereof and provided at its upper end with a handle 19 and slightly below the handle with an eye 20. This eye 20 is adapted to be engaged by the inwardly-projecting arm of a lever 21, pivoted at 22 to one side of the cage. The opposite arm of said lever projects beyond the side of the cage, where it is adapted to be engaged by a hook 23, fixed to the arm of a hammer 24, the latter being pivoted at 25 to the plate 14.

In setting the trap the arm 11 is pulled back to lie parallel to the top of the cage, which opens the door 8 and distends the spring 9. The pin 13 is dropped over the top of the arm, as illustrated in Fig. 2, and the overhanging end of the pin is engaged by the toe 17 of the lever 16, thereby preventing the door from closing. The rod 18 is then drawn upwardly by its handle 19, acting to raise the eye 20 of said rod being passed over the inwardly-projecting arm of the lever 21 and the opposite end of said lever being engaged by the hook 23, holding the hammer 24 in an elevated position. The parts are then in the position illustrated in the drawing figures. As the animal enters the trap to obtain food, which is usually placed near the center of the cage, its weight is transmitted directly to the floor 3 through the bracket 7; but on advancing nearer to the center of the cage the leverage increases, depressing the upper floor at its hinged connection and acting to draw down and disengage the rod 18 from the lever 21. This also disengages the hook 23, allowing the hammer 24 to drop and strike the depending arm of the lever 16, thereby disengaging the toe 17 of said lever from the end of the pin 13 and permitting the door 8 to close under the action of the spring 9.

Although I have described and shown only one door of the trap as being opened and in the set position, it is evident that both doors, if desired, may be thus set and the animal permitted to enter from either end, the pin-and-lever forming elements of the trigger mechanism for springing the trap sufficing to hold both doors in the set position.

It is further evident that various immaterial changes may be made in the construction shown and described, and I consider that I may be entitled to such modifications as fall within the scope of the annexed claims.

Having thus described my invention, I claim as new and desire to secure by Letters Patent—

1. A trap, comprising a cage having a double floor, the upper floor being made in two parts hingedly connected together, a door at one end of the cage, and a trigger mechanism operable to hold the door open and the upper floor elevated at its hinged connection.

2. A trap, comprising a cage having a double floor, the upper floor being made in two parts hingedly connected together at the center of the cage, the outer ends of the hinged members being pivotally supported, a door at each end of the cage, and a trigger mechanism operable to hold the doors open and the upper floor elevated at its hinged connection.

3. A trap, comprising a cage having a double floor, the upper floor being made in two parts hingedly connected together, a spring-operated door closing the cage, means for holding the door open, and means for releasing the door by the weight of an animal on the hinged floor.

4. A trap, comprising a cage having a double floor, the upper floor extending substantially the entire length of the lower floor and being made in two parts hingedly connected together, a door at each end of the cage, a spring connecting the doors together, means for holding the doors open, and means for releasing the doors by the weight of an animal on the hinged floor.

5. A trap, comprising a cage having a floor, a door at one end thereof, means for holding the door in an open position, and a hammer adapted to be connected to the floor and released by the weight of an animal thereon, said hammer acting to disengage the door and permit it to return to a closed position.

6. A trap, comprising a cage having a door, means for holding the door in an open position, and a hammer adapted to be disengaged by the weight of an animal in the cage and acting when released to disengage said holding means and return the door to a closed position.

7. A trap, comprising a cage having a double floor of substantially the same length, the upper floor being made of two members hingedly connected together at the center of the cage, a door at each end of the cage connected together by a spring, a pin adapted to be engaged by a lever for holding the doors of the cage open, means connected to the upper floor of the trap for holding it in an elevated position at its hinged connection, including as an element a hammer, and means whereby when the floor is depressed the hammer is released, acting to strike and disengage the lever from the pin, permitting the doors to return to a closed position.

8. A cage having a double floor, the floors being pivotally connected together and lying in close proximity, a door at one end of the cage, and a trigger mechanism operable to hold the door open and the upper floor in an elevated position.

In testimony whereof I have signed my name to this specification in the presence of two subscribing witnesses.

HENRY S. STICK.

Witnesses:
 WILLIAM H. COOPER,
 JACOB A. SHAFFER.